Oct. 16, 1962 D. M. COWAN ET AL 3,058,238
OPTICAL APPARATUS
Filed Dec. 18, 1959 7 Sheets-Sheet 1

Inventors
D. M. Cowan
W. T. Ricketts
S. P. Cowan

By: Glascock Downing & Seebold
Attys.

Oct. 16, 1962   D. M. COWAN ET AL   3,058,238
OPTICAL APPARATUS

Filed Dec. 18, 1959   7 Sheets-Sheet 2

Inventors
D. M. Cowan
W. T. Ricketts
S. P. Cowan
By: Glascock Downing & Seebold
Attys.

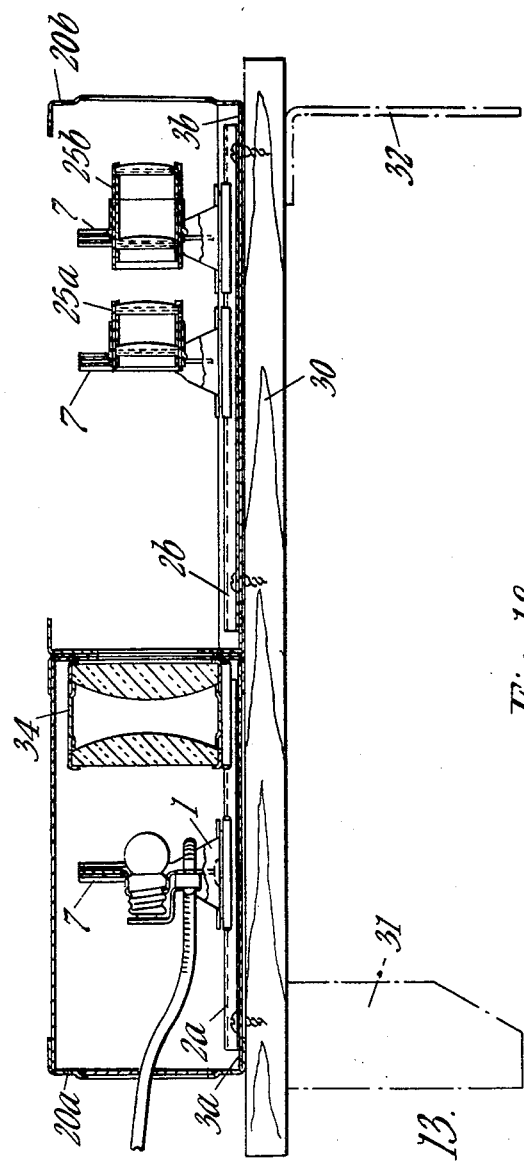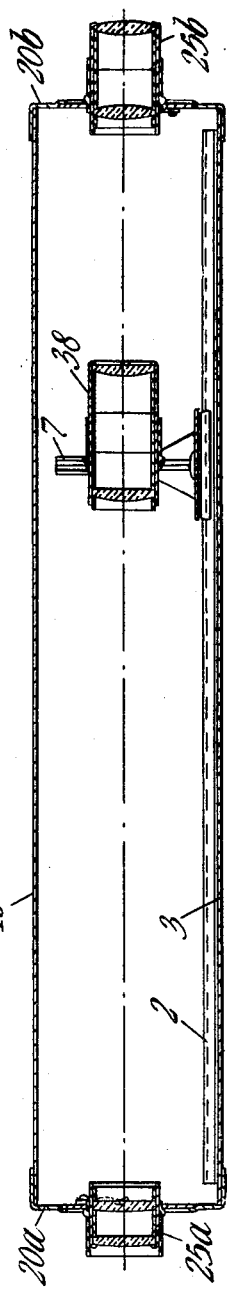

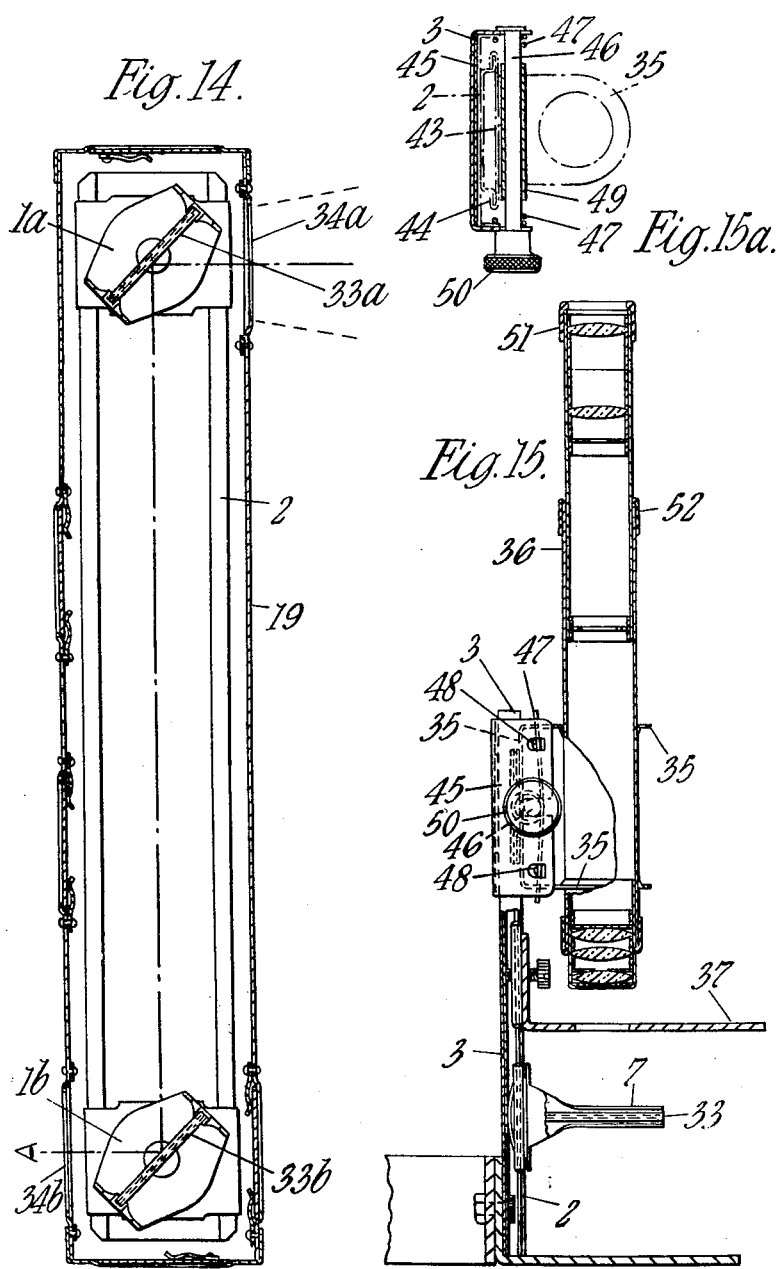

Oct. 16, 1962 D. M. COWAN ET AL 3,058,238
OPTICAL APPARATUS
Filed Dec. 18, 1959 7 Sheets-Sheet 5

Inventors
D. M. Cowan
W. T. Rickets
S. P. Cowan
By Glascock Downing & Seebold
Attys.

Oct. 16, 1962   D. M. COWAN ET AL   3,058,238
OPTICAL APPARATUS
Filed Dec. 18, 1959   7 Sheets-Sheet 6

Inventors
D. M. Cowan
W. T. Ricketts
S. P. Cowan
By: Glassock Downing & Seebold
Attys.

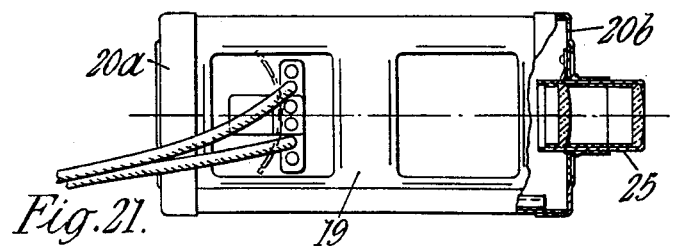
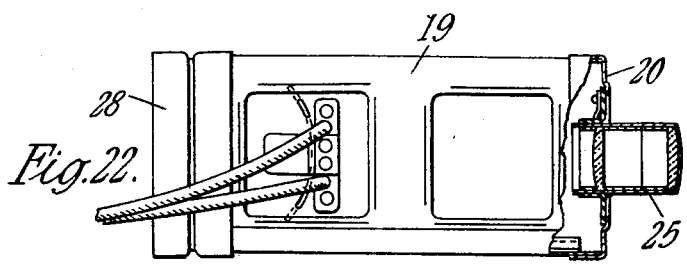
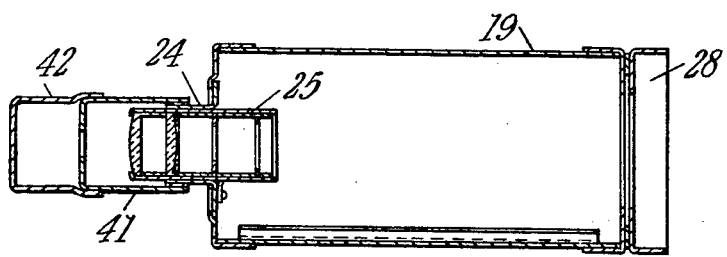
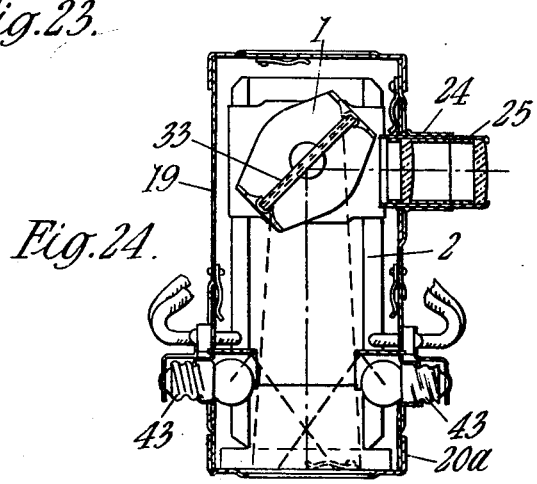

3,058,238
Patented Oct. 16, 1962

3,058,238
OPTICAL APPARATUS
David Mark Cowan, Bexley Heath, Kent, William Thomas Rickets, Welling, Kent, and Stanley Philip Cowan, London, England; said Rickets assignor to said David Mark Cowan and said Stanley Philip Cowan
Filed Dec. 18, 1959, Ser. No. 860,493
Claims priority, application Great Britain Dec. 31, 1958
5 Claims. (Cl. 35—19)

This invention relates to optical apparatus and has for its main object to provide a form of apparatus which is suitable for use in the educational or recreational field and which will enable instructors, students and others to measure the radius of curvature of optical elements and/or the focal lengths thereof and effect the building or construction of a variety of optical instruments from a simple collection of parts or elements.

Optical measurements, experiments and tests are normally carried out with the aid of an optical bench, which usually takes the form of a straight horizontal member on which is mounted a series of sliding carriages suitable for holding optical elements in any desired position in relation to one another. In this way, for example, a series of lenses can be mounted and slidably adjusted in relation one to another so as to form the optical system of a telescope and when correctly adjusted can be tested for quality of optical performance, but when this is done the optical elements must be removed from the optical bench and mounted in a housing specially designed to suit the use of the particular instrument in question.

According to the present invention however, an optical apparatus is provided comprising a collection or kit of parts or elements, so constructed as to be capable of assembly in a variety of different ways to form optical systems or instruments varying in character or purpose according to the method of assembly chosen, and the setting or positioning of the parts or elements selected.

According to the preferred arrangement, the aforesaid parts or elements comprise lenses, mirrors, prisms, and other optical elements together with means for adjustably supporting or positioning such parts or elements whereby an operator may measure radii and focal lengths of lenses or mirrors, set up and test optical systems, and/or by the addition of covers, end caps or other attachment parts complete the assembly of any selected optical instrument.

Preferably the apparatus comprises a tray or like support member arranged therein a slideway for receiving and retaining one or more holders or carriages for optical elements used in the construction of optical instruments whereby such elements may be suitably mounted and positioned according to the instrument selected, and when so mounted are readily accessible for adjusting and testing.

Preferably also the aforesaid slideway comprises a flanged member disposed on the floor of the tray, and the tray is provided with a cover and two end caps which when assembled together form a closed container for the elements or parts mounted on the slideway.

Preferably also the aforesaid holder or carriage which is adapted to be slidably arranged on the aforesaid slideway, is itself provided with a swivelling mount having grooves or other means for the reception of the elements of the kit of parts, so that by means of this holder or carriage, optical elements and illuminating devices such as mirrors, lenses or prisms with or without suitable adaptors may be inserted into the grooves and adjusted to any desired angle in relation to the optical axis of the instrument under construction, or a lampholder of suitable shape can be inserted and adjusted relative to the optical system in any direction by turning the swivelling mount and by slidably adjusting the lampholder in the mount and the tray.

The invention will be more completely understood from the following detailed description which is given in conjunction with the accompanying drawings, in which:

FIGURES 13–24 illustrate how a number of different optical instruments can be built up from the various parts provided, FIGURE 13 being a side view of a diascope;

Figures 16, 17:
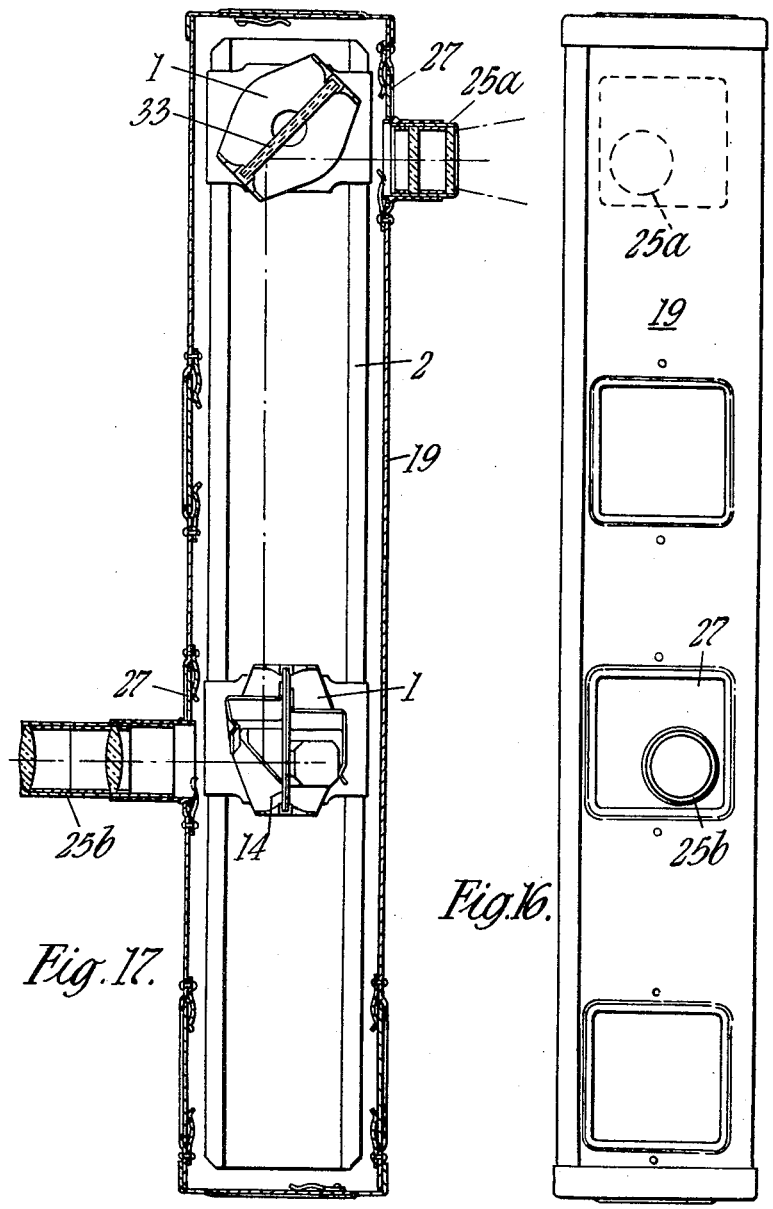
Figure 20:
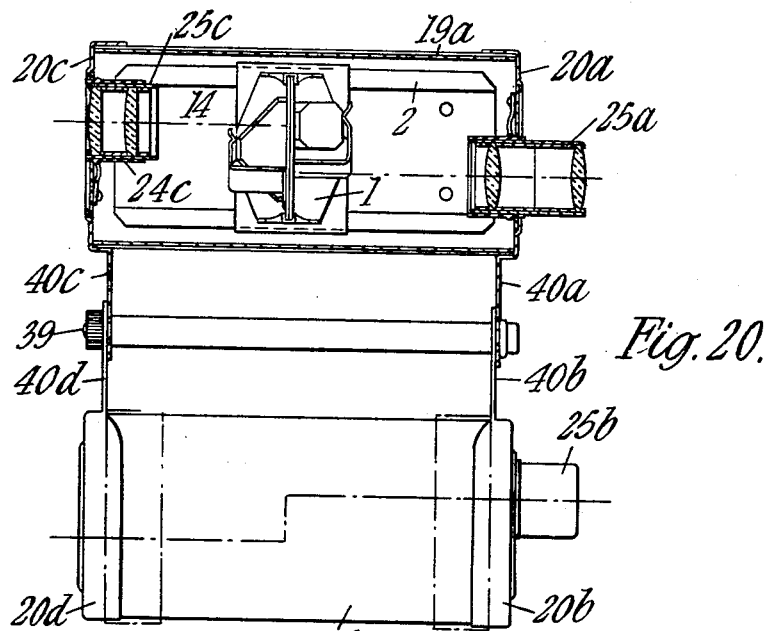
Figure 19:
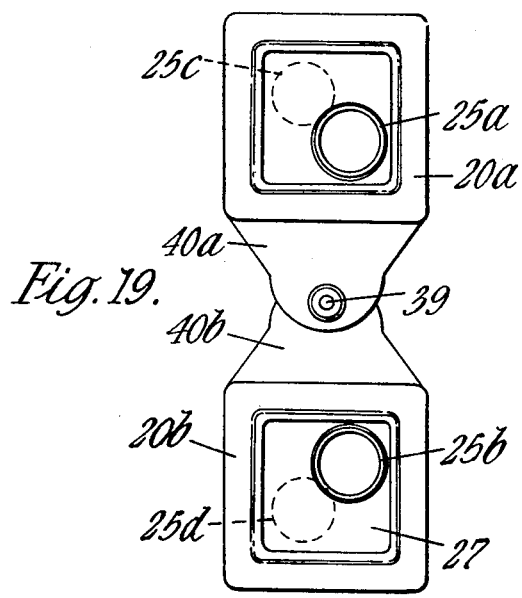

FIGURE 14 being a side view of a mirror periscope;

FIGURE 15 being a side view of a microscope;

FIGURE 15a being a sectional side view of the mounting arrangement shown in FIGURE 15 for the lens holder;

FIGURES 16 and 17 being front and sectional side views of a prismatic periscope;

FIGURE 18 being a side view of a lens erecting telescope;

FIGURES 19 and 20 being end and part sectional side views of a pair of prismatic binoculars;

FIGURE 21 being a side view of an episcope—rear projection type;

FIGURE 22 being a side view of an episcopic enlarger;

FIGURE 23 being a side view of a camera; and

FIGURE 24 being a side view of an episcope—front projection type.

Referring now to these drawings, it will be seen that the invention provides a large number or kit of parts which can be assembled together in a variety of different ways to form different optical instruments. Some of the more important of these individual parts are shown in FIGURES 1–12 and in FIGURES 1 and 2, there is shown a universal holder 1 mounted on a slideway 2 which is in turn mounted upon the floor of a tray 3, the latter being mounted on a pair of support brackets 4, 5, to which it is secured by bolts 6.

Conveniently, the aforesaid universal holder 1 comprises an upright U-shaped frame member, the arms 7 of which are grooved or channeled to receive the optical element to be mounted, and such frame member is mounted by a vertical pin 8 on the horizontal base 9 of the universal holder, such base having flanged edges 10 for engaging with the edges of the aforesaid slideway 2, so that the optical element may be detachably mounted in the universal holder and the latter can then be rotated about its mounting pin 8 and moved longitudinally along the slideway as required.

In order that the universal holder may be retained in any position to which it is moved on the slideway, the horizontal base 9 of the holder is provided with a bowed spring 9a which is held in place by a pair of small flanges 9b and exerts a slight pressure on the floor of the slideway and makes frictional engagement therewith. If desired the floor of the slideway may be provided with a low upstanding longitudinal ridge or rib so that the centre of the spring 9a can contact this ridge or rib instead of the floor of the slideway. By means of this arrangement, the sliding movement of the holder is considerably facilitated.

The grooves in the arms of the universal holder are adapted to receive square or rectangular shaped plates 14 (FIGURES 3, 4 and 5) so that optical elements such as prisms 12, 13 mounted in such plates may be readily mounted in the universal holder, the arrangement having the advantage that if the prisms are offset from the centre of the plate, the latter may be inserted in any one of four different positions. It is to be understood however, that these prisms may be readily replaced by any other optical element, such as a mirror as shown in FIGURES 14, 17 or 24, a lampholder as shown in FIGURE 13, or a lens holder as shown in FIGURE 13 or 18.

Figure 1:
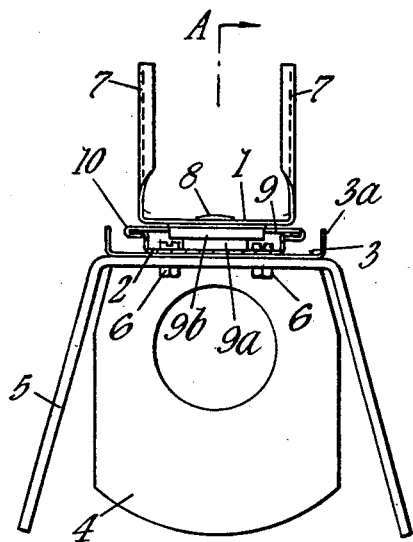
FIGURES 1 and 2 are end and sectional side views respectively of a universal holder mounted on a slideway in readiness to receive an optical element.
Figure 3:
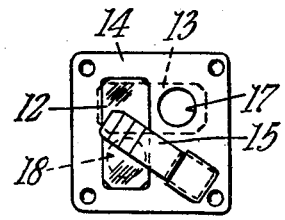
FIGURES 3, 4 and 5 are front, side and rear views respectively of an optical element, in this case a set of prisms, for mounting in the universal holder shown in FIGURE 1.
Figure 4:
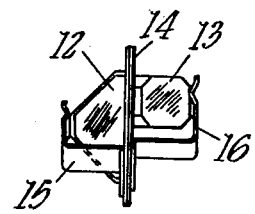
Figure 2:
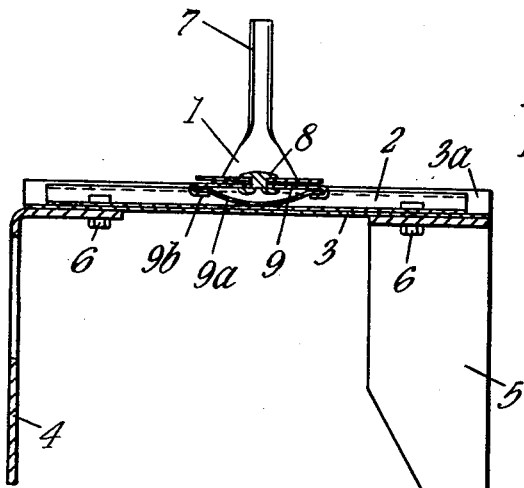
Figure 5:
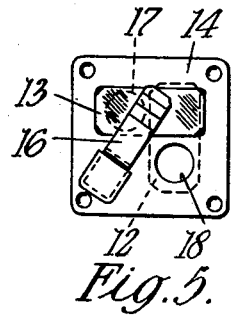

Thus as can be seen from FIGURES 3, 4 and 5 an erecting prism assembly may be built up comprising two prisms 12, 13 mounted one each side of a square shaped plate 14 and held in place by spring clips 15, 16, the plate 14 being provided with two circular apertures 17, 18 to provide a light path through the plate opposite the prisms. A prism assembly constructed in this way can then be inserted in the grooves of a universal holder in any one of four positions to suit an optical assembly and when the two prisms are of different sizes the plate can be reversed in the grooves giving a further four available prism positions; thus by this arrangement, the use of separate left and right hand parts is avoided, the one unit performing both functions; such being necessary for example when making a binocular instrument as shown in FIGURES 19 and 20 where left and right hand assemblies are required.

Figure 6:
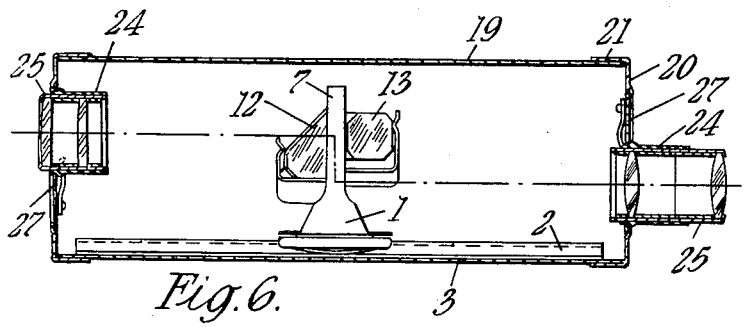
FIGURE 6 is a side view of a slideway with a universal holder and prism assembly mounted within a box like structure to form a prismatic telescope.
Figure 7:
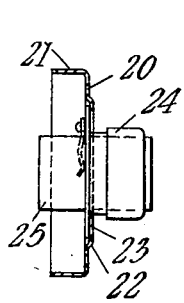
FIGURES 7 and 8 are side and end views respectively of an end cap for use with a box like structure such as that shown in FIGURE 6.
Figure 8:
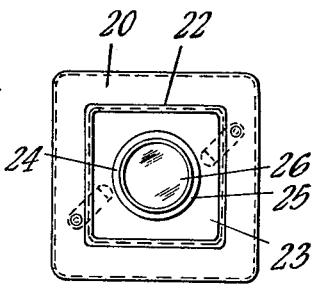
Figure 9:
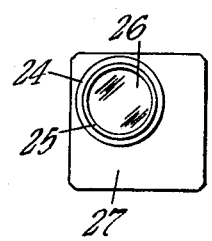
FIGURE 9 is an end view of a modified form of eyepiece for use in the end cap shown in FIGURES 7 and 8.

In order to build up an optical instrument such as a telescope such as is shown in FIGURE 6 using the universal holder and slideway as a basis, a three sided housing 19 of channel or U-shaped section preferably formed of sheet metal is provided, this housing being so shaped and arranged as to enable its edges to fit into the upturned flanged edges 3a (FIGURE 1) of the tray 3 so as to form a hollow box like structure of square or rectangular shaped section, and for the purpose of closing the ends of this structure end caps 20 (FIGURES 7 and 8) of similar shaped section are provided, these end caps having flanged edges 21 which are adapted to fit over the ends of the box like structure. Each of these end caps has a square shaped opening 22 (FIGURE 8) in its centre into which there is detachably mounted an apertured plate 23 carrying a tubular member 24, in which there is slidably mounted a lens holder 25 carrying a lens or eyepiece 26. These end caps when fitted with suitable lenses and mounted in position on the ends of the aforesaid box like structure can then be used to form the eyepiece and object lens of a telescope as shown in FIGURE 6. It will be seen however, that this is a prismatic telescope having a prism assembly constructed as shown in FIGURES 3, 4 and 5 mounted in the centre of the box like structure, this prism assembly being carried by a universal holder 7 mounted on a slideway 2 which is in turn mounted on the base or tray 3. In order to enable the lens to be suitably positioned to cooperate with the prism assembly, alternative apertured plates 27 (FIGURE 9) with the tubular member 24 carrying the lens holder 25 offset are provided so that these plates can be substituted for those in the end caps, and be so arranged as to be oppositely disposed in the two end caps of an instrument as shown in FIGURE 9.

Figure 10:
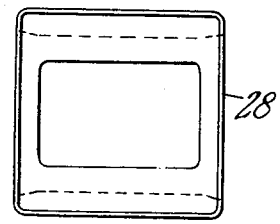
FIGURES 10 and 11 are end and side views respectively of a film holder for use in a projector.
Figures 11, 12:
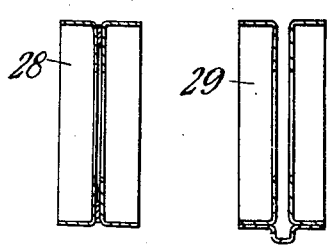
FIGURE 12 is a side view of a plate holder for use in a projector.

It is to be understood however, that these end caps together with the optical elements which they carry may be readily varied to suit the particular instrument being built up, or they may be blanked off where end apertures are not required, or substituted by frame pieces 28 or 29 such as are shown in FIGURES 10, 11 and 12 for mounting films or plates in an instrument such as an enlarger or projector. Thus for example, in the case of a simple periscope comprising two mirrors, one aperture is required at each end of a cover and on opposite sides thereof but apertures are not required in the end caps, alternatively in the case of a straight telescope, side apertures are not required but apertures in the two end caps are necessary; thus one set of two end caps and one cover can be used for a variety of optical assemblies by the provision of suitable interchangeable blanking caps and attachments.

The arrangement may be readily adapted for making long or short optical instruments by varying the length of the tray and box like cover or by providing a plurality of trays and covers of different lengths. Thus a straight telescope for example employing a lens erector system between the eyepiece and objective lenses such as is shown in FIGURE 18 requires a longer tray and cover than a telescope in which a prism or mirror system is used such as is shown in FIGURE 6. Also long focal length lenses require longer trays, and covers than short focal length lens systems. Further flexibility in length is obtained by providing three or more trays and covers of different lengths which can be used separately or in combination to cover the scope of the optical elements capable of being made with the parts or elements provided in the kit and these can be joined together by simple means such as elastic bands or adhesive plastic tape, alternatively, as for example when building an optical projector or diascope such as is shown in FIGURE 13, two or more trays 3a, 3b can be secured to a long strip of wood 30 or other material thus making a more rigid assembly to which end caps 20a, 20b can be fitted as necessary, alternatively, two trays may be connected by a long slider fitted with clamping screws or fixed to an inverted tray.

An advantage of the arrangement is that all lenses can be of the same diameter and therefore interchangeable, thus enabling combinations of lenses to be used together to form long or short focus units so that similar lenses can be used for a variety of applications, for example, two short focus lenses can be used together to form a short focus eyepiece as shown in FIGURE 6 or the same lenses in combination can be used for a microscope objective as shown in FIGURE 15 or various combinations of lenses can be used to produce a variety of different focal length units for telescope objectives, projection lenses and the like, the focal lengths of the various separate lenses provided being selected so that combinations of these lenses when used with or without prisms and mirrors may be used with trays and covers provided with the kit of parts; for example, assuming lenses in combination or separately, produce focal lengths of 4", 6" and 10" the kit may be provided with trays and covers of three similar lengths and when prisms are used in the optical system, one of the longer focal length combinations of lenses for a particular tray length would be selected to allow for the shortening effect of the prisms.

It will thus be seen that by means of this invention a wide variety of instruments can be built with the same parts, the mechanical and the optical parts being constructed in the form of suitable units to render this possible. Thus for example, trays, covers and end caps are equally suitable for building telescopes of either the astronomical, or terrestrial type, the units being suitably arranged with prisms or lenses to form microscopes, episcopes, diascopes, enlargers, stereoscopes, spectroscopes, kaleidoscopes, projection microscopes, cameras, camera obscura and many other optical instruments all with the same common parts and optical elements.

In order to enable electrical illumination to be provided in instruments where this is needed, lampholders are provided having peripheral flanges similar in shape to the prism or mirror support plates 14 (FIGURE 3) so that they may be interchangeable therewith, thus permitting these lampholders to be fitted into one of the aforesaid universal holders as shown in FIGURE 13 or into the apertures in the covers or the recesses in the end caps, depending whether the arrangement is for straight projectors as for diascopes and enlargers or for angular projectors such as episcopes. In any such arrangement the leads from the lamps may be connected to a suitable source of supply which in one preferred form for electrical safety may be low voltage transformers, accumulators or dry batteries.

Examples of various optical instruments which can be formed from assembling the parts hereinbefore described in different ways are shown in FIGURES 13–24.

Thus FIGURE 13 shows a diascope formed from two tray members 3a and 3b disposed in line with one another, and mounted on a support base 30 carried on brackets 31 and 32, each tray member carrying a slide 2a, 2b for the arrangement of the necessary optical elements mounted in universal holders. Thus one slide 2a is arranged to carry a lampholder 33 and a condenser lens holder 34, while the other slide 2b is arranged to carry one or more lens holders such as 25a, 25b.

FIGURE 14 shows a mirror periscope formed from two mirrors 33a, 33b which are mounted in universal holders 1a, 1b, which are themselves slidably mounted on a slideway 2 disposed in a box like structure having side openings opposite the mirrors, the unwanted apertures in the end caps and the unwanted aperture in the cover being blanked off.

FIGURE 15 shows a microscope formed from an upright slideway 2, on which is mounted a bracket member 35 carrying a tubular lens holder 36, an apertured slide carrier 37, and a universal holder 7 carrying a mirror 33 for the reflecting light on to the slide carrier.

The bracket member 35 is constructed in U-shaped section, and the base of this bracket is secured by flanged edges, bolts or other suitable means to a flat carrier 43 which is slidably mounted by means of side flanges 44 on the slideway 2 which is mounted on the upright tray member 3, so that by means of this arrangement the bracket member 35 together with the tubular lens holder 36 can be moved up and down on the slideway 2 as required. This provides for a rough adjustment of the lens holder, but in order to provide a fine adjustment, an additional U-shaped frame member 45 is provided which embraces the upright tray member 3 between its arms, and is provided with a transverse spindle 46 which is mounted in slots in the arms of the frame member 45 and is held in place by a pair of spring members 47 which are mounted in tongues 48 so arranged that the springs hold the spindle 46 or a friction member 49 mounted thereon in contact with the base of the bracket member 35. The end of the spindle 46 is provided with a control knob 50, so that by rotating this knob the bracket member 35 together with the carrier 43 can be moved backwards and forwards on the slideway 2 between the limits determined by the arms of the bracket, thus enabling a fine adjustment of the lens holder to be effected after the initial rough adjustment has been carried out.

The tubular lens holder 36 may be constructed in any suitable manner, and this holder is conveniently provided with a moulded rubber eye cap 51 and a moulded rubber ring 52 as shown.

FIGURES 16 and 17 show a prismatic periscope formed from a mirror 33, and a prism assembly 14, each being mounted on separate universal holders 1, which are mounted on a slideway 2 disposed in a box like structure 19 having side openings opposite the mirror and prism assembly respectively for the receipt of lens holders 25a, 25b.

FIGURE 18 shows a lens erection telescope formed from a lens assembly 38 mounted in a universal holder 7 disposed on a slideway 2, which is arranged in a box like structure 19 having two end caps provided with lens holders, for objective and eyepiece lenses.

FIGURES 19 and 20 show a pair of prismatic binoculars formed from a pair of box like structures 19a, 19b pivoted to a common support shaft 39 by lateral tongues 40a, 40b, 40c, 40d attached to the end caps 20a, 20b, 20c, 20d, the latter having offset lens holders 25a, 25b, 25c, 25d, and end box like structure having a prism assembly 14 mounted in a universal holder 1 on a slideway 2.

FIGURE 21 shows an episcope of the rear projection type formed from a box like structure 19 with a set of lamps mounted on the sides of the cover and a picture holder mounted in one end cap and a lens holder 25 mounted in the other end cap 20b.

FIGURE 22 shows an enlarger for making positives from paper negatives, formed from a box like structure 19 with a set of lamps mounted on the sides of the cover, and a negative holder 28 which forms an end cap at one end of the structure and a lens holder 25 mounted in and end cap 20 at the opposite end of the structure.

FIGURE 23 shows a camera for paper negatives formed from a box like structure 19 having a negative holder 28 at one end, and an end cap 20 at the other end, the latter being provided with a lens holder 25 mounted in a tubular member 24 on which is mounted an apertured lens cap 41 carrying a closure cap 42.

FIGURE 24 shows an episcope of the front projection type formed from a box like structure 19 with a set of lamps mounted in the side walls, an end cap 20a, a mirror 33 mounted in a universal carrier 1 slidably arranged on a slideway 2, and a lens holder 25 mounted on a tubular member 24 formed in the side wall of the structure.

The kit of parts or elements forming the apparatus may be housed in a box or other container, which may be provided with means for effecting the interchange of opaque and translucent projection screens and for the hooding of such screens by the lid of the box for the purpose of reducing the effect of stray light on the surface of the screens. If desired, the box may be used in conjunction with the lid for supporting the screens in an upright position, the lid being preferably of same depth as the box to afford maximum hooding effect, and the box and lid being of such proportions that the effective area of the screen is above the top edge of the box when erected and is thus unobstructed when viewed from either direction as is necessary for rear projection viewing.

We claim:

1. Optical apparatus for effecting the construction of a variety of optical instruments from a collection of parts, comprising a support member having thereon a slideway, and a holder for an optical element mountable on said slideway, said holder having a flanged base for making slidable engagement with said slideway, a rotatable mount having means for detachably supporting an optical element, and resilient means for making frictional contact with said slideway whereby an optical element may be adjustably positioned on said slideway and set to any selected angle in relation to the optical axis of the instrument under construction, said rotatable mount comprising a U-shaped frame member having upstanding arms, said arms being provided with grooves for the reception of a plate member carrying an optical element.

2. Optical apparatus for effecting the construction of a variety of optical instruments from a collection of parts, comprising a support member having thereon a slideway, and a holder for an optical element mountable on said slideway, said holder having a flanged base for making slidable engagement with said slideway, a rotatable mount having means for detachably supporting an optical element' and resilient means for making frictional contact with said slideway whereby an optical element may be adjustably positioned on said slideway and set to any selected angle in relation to the optical axis of the instrument under construction, said rotatable mount comprising a U-shaped frame member having upstanding arms, said arms being provided with grooves for the reception of a plate member carrying an optical element, and said plate member being provided with spring clip means for detachably securing said optical element in position, and with an aperture for providing a light path.

4. Optical apparatus for effecting the construction of a variety of optical instruments from a collection of parts, comprising a support member having thereon a slideway, and a holder for an optical element mountable on said slideway, said holder having a flanged base for making slidable engagement with said slideway, means for detachably supporting an optical element, and resilient means for making frictional contact with said slideway, and a box like cover, and two end caps, said box like cover being engageable with said support member to form a housing for an optical element mounted on said slideway, and said end caps being engageable with the ends of the housing so formed.

4. Optical apparatus for effecting the construction of a variety of optical instruments from a collection of parts, comprising a support member having thereon a slideway, and a holder for an optical element mountable on said slideway, said holder having a flanged base for making slidable engagement with said slideway, means for detachably supporting an optical element, and resilient means for making frictional contact with said slideway, a box like cover, two end caps and two plate members, engageable with said end caps, said box like cover being engageable with said support member to form a housing for an optical element mounted on said slideway, and said plate member having apertures containing the appropriate optical elements for the instrument under construction.

5. Optical apparatus for effecting the construction of a variety of optical instruments from a collection of parts, comprising a support member having thereon a slideway, and a holder for an optical element mountable on said slideway, said holder having a flanged base for making slidable engagement with said slideway, means for detachably supporting an optical element, and resilient means for making frictional contact with said slideway, a box like cover, two end caps and two plate members, engageable with said end caps, said box like cover being engageable with said support member to form a housing for a optical element mounted on said slideway, and said plate member having apertures containing the appropriate optical elements for the instrument under construction, the apertures in said plate members being offset to enable said optical elements to be suitably positioned with respect to the optical axis of an instrument using a prism.

References Cited in the file of this patent

UNITED STATES PATENTS

| | | |
|---|---|---|
| 1,305,980 | Henker | June 3, 1919 |
| 1,521,339 | Taylor | Dec. 30, 1924 |
| 1,849,305 | Margarian | Mar. 15, 1932 |
| 2,466,015 | Ewing | Apr. 5, 1949 |
| 2,803,986 | Choiniere et al. | Aug. 27, 1957 |
| 2,935,797 | Morris | May 10, 1960 |

FOREIGN PATENTS

| | | |
|---|---|---|
| 289,574 | Great Britain | May 3, 1928 |
| 655,856 | Great Britain | Aug. 1, 1951 |